A. C. EASTWOOD.
SYSTEM OF CONTROL FOR ELECTRIC MOTORS.
APPLICATION FILED DEC. 3, 1908.
940,241.
Patented Nov. 16, 1909.
2 SHEETS—SHEET 1.
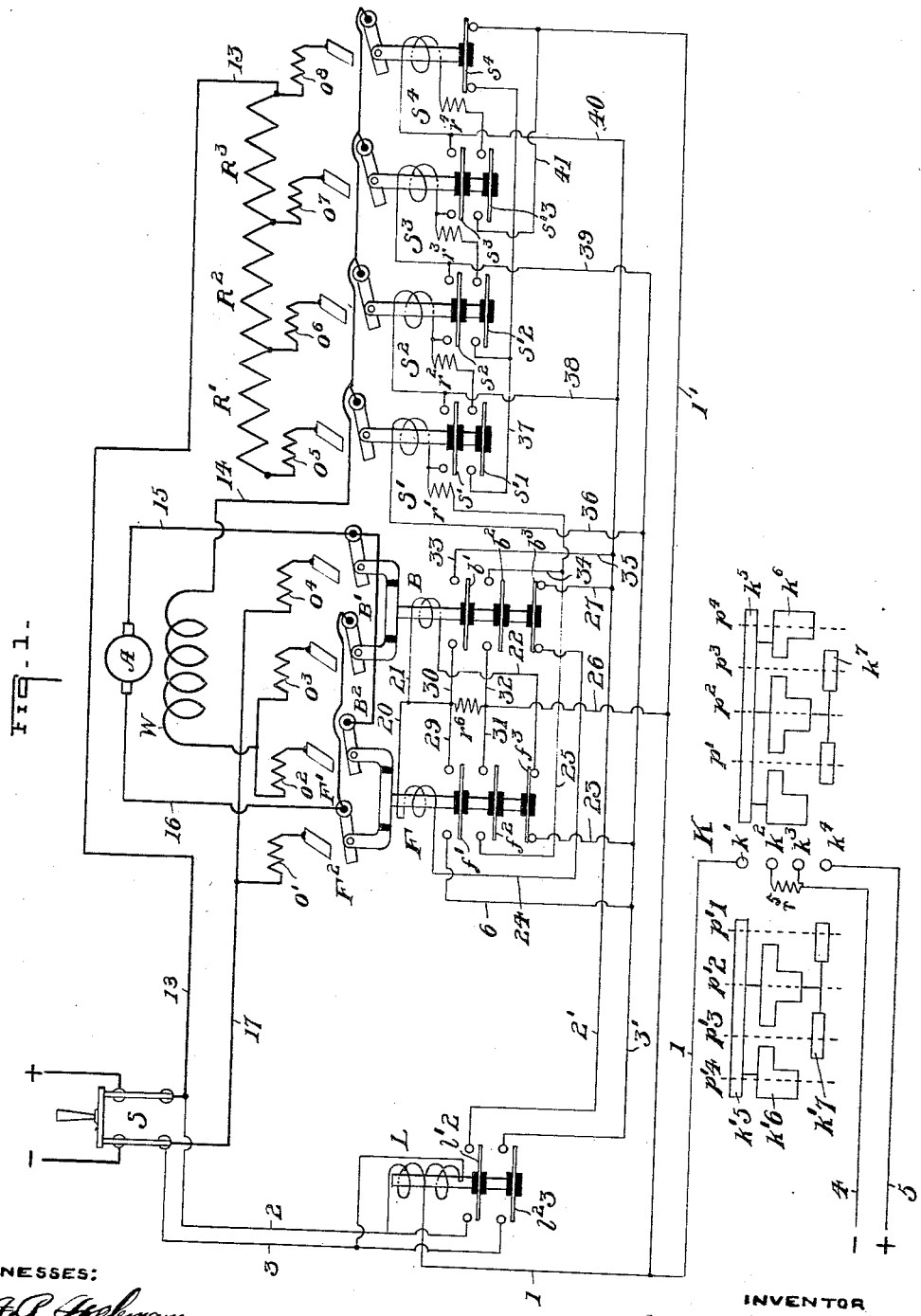
WITNESSES:
INVENTOR
A. C. Eastwood
by F. N. Barber
ATTORNEY

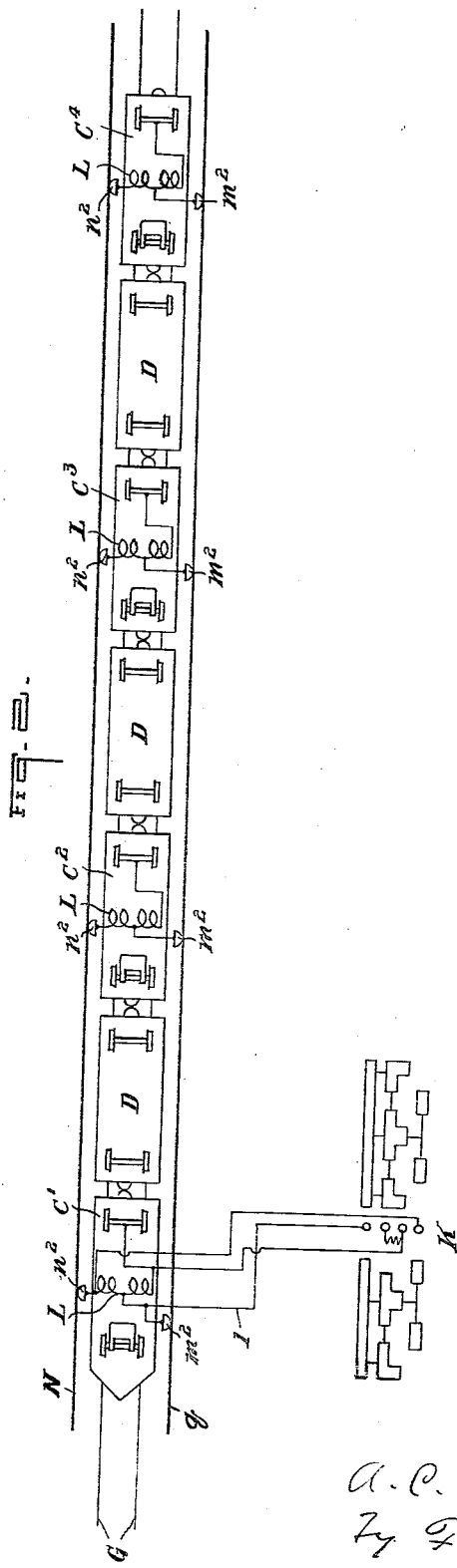

UNITED STATES PATENT OFFICE.

ARTHUR C. EASTWOOD, OF CLEVELAND, OHIO.

SYSTEM OF CONTROL FOR ELECTRIC MOTORS.

940,241.   Specification of Letters Patent.   Patented Nov. 16, 1909.

Application filed December 3, 1908. Serial No. 465,818.

*To all whom it may concern:*

Be it known that I, ARTHUR C. EASTWOOD, a citizen of the United States, residing at Cleveland, in the county of Cuyahoga and State of Ohio, have invented or discovered new and useful Improvements in Systems of Control for Electric Motors, of which the following is a specification.

My invention relates to an improved system of control for electric motors.

The object of my invention is to produce a system of control by means of which one or more motors may be controlled both as to the direction of their rotation and their speed in either direction by means of a master controller, there being but a single control conductor extending from the master controller to the speed and direction controlling devices of the motors to be controlled.

In carrying out my invention I make use of independently actuated switches for controlling the speed of the motor. In practice it has been found highly desirable, and in many cases essential, that the operator be provided with controlling means of such nature that a reliable step by step control of motor speed be obtained. It has been further found in practice that independently actuated or unit switches form a preferable means for making and breaking the various circuits utilized in the speed control of motors, this being particularly true in the case of railway motors of considerable power and in cases where a number of motor driven cars are placed in a train and controlled by a single master controller, usually placed at the forward end of the leading car of the train.

Referring to the accompanying drawings, Figure 1 shows a diagram of the electrical connections of my system of control applied to rheostatic control of a single series wound motor, and Fig. 2 shows diagrammatically the same system of control applied to the motors on several motor cars of a train, all of the motors being controlled from a master controller on the leading car of the train.

Referring to Fig. 1, S designates a double pole switch connected to the plus and minus sides of a power circuit.

A is the armature of the motor to be controlled, and W the series field winding of the same.

F and B are reversing switches of the electro-magnetically actuated type. If the switch F is closed the armature of the motor will revolve in a forward direction; but when the switch B is closed the armature will revolve in a reversed direction.

$R'$, $R^2$, and $R^3$ are sections of resistance governed by the electro-magnetically actuated switches $S'$, $S^2$, $S^3$, and $S^4$.

K is the master controller which is actuated by the operator to obtain the desired direction of rotation and speed of the motor. The master controller K is indicated as of the drum type having stationary contact fingers $k'$, $k^2$, $k^3$, and $k^4$, each arranged to coöperate with two systems of strips or contact segments carried by the drum of the controller at either side of its off-position. In Fig. 1 the drum of the controller is shown as developed in the off-position, in which position none of the contact fingers make contact with the segments in either system of strips.

1 is a single control conductor leading from the master controller K to the magnetically actuated motor controlling apparatus.

L is a differently wound relay which governs the connection of the control circuit to the power circuit.

4 and 5 are wires connecting fingers $k^3$ and $k^4$ of the master controller to the power circuit at a point adjacent to the controller K, it being assumed that the power wires are available for connection at this point as well as at the switch S which supplies current for the motor and for the control conductors $2'$ and $3'$. If now the drum of the master controller be revolved toward the left, contact strip $k^5$ will come into contact with the finger $k'$ and the long side of the contact strip of the row $k^6$ will bridge the contact fingers $k^2$ and $k^3$. This will establish circuits as follows: from the positive side of the switch S, through the wire 2, the upper half of the winding of the relay L, the control conductor 1, the finger $k'$, the strip $k^5$, through the connection to the strip $k^6$, thence to contact finger $k^3$ and the wire 4 to the negative side of the power circuit. This energizes the upper half of the winding of the relay L and causes it to lift its plunger thereby closing the auxiliary switches $l^2$ and $l^3$. The closure of the switch $l^2$ connects the control wire $2'$ to the wire 2, which in turn is connected to the positive side of the power circuit at the switch S and the closure of the switch $l^2$ connects the control wire 3′ to the wire 3 which in turn is connected to the negative side of the power circuit at the switch S.

It will be observed that one side of the winding of the reversing switch F is connected to the positive side of the main switch S through the wire 2, the switch $l^2$, the wire 27, the auxiliary switch $b^3$, carried by the reversing switch B, and the wire 24, while the other end of this winding is connected to the wire 20, the current-limiting resistance $r^6$, the wire 26, and the control conductor 1′, which, in the first position of the master controller as above noted, is connected to the negative side of the line through the contact finger $k'$, the strip $k^5$, the contact finger $k^3$ and the wire 4. The circuit through the winding of the reversing switch F is thus complete, causing the switch to close. The switch F carries the auxiliary switch contacts $f'$, $f^2$, and $f^3$. After the switch F has closed, the closure of the switch $f'$ completes the circuit of the winding of the reversing switch F as follows: from the positive side of the switch S, through the wire 2, the auxiliary switch $l^2$, the wire 2′, the wire 27, the auxiliary switch $b^3$, the wire 24, the winding of the coil of the switch F, the wire 20, the wire 29, the auxiliary switch $f'$, the wire 6, the wire 3, the auxiliary switch $l^3$, and the wire 3 to the negative side of the main switch S. Through this circuit the reversing switch F is held closed through the subsequent operation of the master controller in the forward direction. The switch $f^3$ carried by the reversing switch F opens when the switch F closes, thereby disconnecting the winding of the other reversing switch B from the wire 3′, this connection having previously existed through the wire 22, the auxiliary switch $f^3$, and the wire 23. The reversing switch B is therefore inoperative as long as the reversing switch F is closed. The auxiliary switch $f^2$, carried by the reversing switch F closes a connection from the control conductor 1 to the winding of the resistance switch S′ as follows: from the wire $l'$, through the wire 26, the wire 31, the switch $f^2$, the wire 25, through the resistance $r'$ to the winding of the switch S′. It will be observed that the other end of the winding of the switch S′ is connected by the wire 36 to the conductor 3′, which in turn is connected to the negative side of switch S through the auxiliary switch $l^3$ and the wire 3. Under this condition both ends of the winding of the switch S′ are connected to the negative side of the line when the master controller is in its first position. When, however, the master controller is advanced to its first running position corresponding to the dotted line $p'$, the control conductor 1 is connected to the positive side of the line through the contact finger $k'$, the strip $k^5$, the strip $k^7$, the contact finger $k^4$ and the wire 5. The circuit through the winding of the switch S′ is then completed as follows: from the positive side of the line, through the wire 5, the contact finger $k^4$, the strip $k^7$, the strip $k^5$, the contact finger $k'$, the control conductor 1, the wire $l'$, the wire 26, the auxiliary switch $f^2$, the wire 25, the resistance $r'$, the winding of the switch S′, the wire 36, the control wire 3′, the auxiliary switch $l^3$, and the wire 3 to the negative side of the switch S. Switch S′ then closes. In passing from the first position of the master controller to the position corresponding to $p'$, the extended lower portion of the contact strips $k^6$ first opens circuit with the contact finger $k^2$, thereby cutting into the circuit the current limiting resistance $r^5$. The contact strip $k^7$ makes contact with the finger $k^4$ before contact strip $k^6$ opens the connection with the contact finger $k^2$. The current limiting resistance $r^5$ serves to limit the flow of current through a local circuit which is established as follows: from the positive wire 5 to the contact finger $k^4$, thence to the contact strip $k^7$, the strip $k^6$, the contact finger $k^2$, and the resistance $r^5$ to the negative wire 4. When the contact strip $k^7$ makes connection with the contact finger $k^4$, it will be seen that the control conductor 1 is connected to the positive side of the line while the upper end of the winding of the relay L is also connected to the positive through the wire 2. The upper half of this winding, therefore, is short circuited and inoperative, but current flows through the lower half of the winding by way of the control conductor 1 and the wire 3 to the negative side of the switch S. The relay L, therefore, remains closed. The closure of switch S′ establishes the main circuit through the motor as follows: from the positive side of the switch S, through the wire 13, the resistance sections $R^3$, $R^2$, and $R'$, the blow-out winding $o^5$ and the contacts of the switch S′, the wire 14, the field winding W, the blow-out winding $o^3$, and the contacts of the switch F′, the wire 15, the armature A, the wire 16, the contacts and the blow-out winding $o'$ of the switch F², and the wire 17 to the negative side of the switch S. The circuit through the motor is thus completed with all of the speed controlling resistances $R'$, $R^2$, and $R^3$ in circuit. The motor should therefore start and operate at a minimum speed.

The switch S′ carries the two auxiliary switches $s'$ and $s'^1$, which close when the switch S′ closes. The switch $s'$ in closing completes a local circuit to the winding of the switch S′ as follows: from the negative control wire 3′, through the wire 36, the winding of the switch S′, the auxiliary switch $s'$ and the wire 38 to the positive control wire 2'. This circuit is maintained through subsequent operations of the master controller in the said direction from the off-position. The second auxiliary switch $s'^1$ carried by the switch S' serves to connect one end of the winding of the switch $S^2$ to the control conductor 1' through the wire 37 and the auxiliary switch $s^4$ carried by the last resistance switch $S^4$. In the position $p'$ of the master controller the control conductor is connected to the positive side of the line through the contact finger $k^4$ as previously mentioned. It will be seen also that the upper end of the winding of the switch $S^2$ is connected to the positive control wire 2' by the wire 38. No current, therefore, can flow through the winding of the switch $S^2$. When, however, the master controller is moved to its next running position, indicated by the line $p^2$, the control conductor will be again connected to the negative side of the line through the contact finger $k'$, the strip $k^5$ and the lower portion of the strip $k^6$, the contact finger $k^2$, and the wire 4. The circuit will then be completed through the winding of the switch $S^2$ and this switch will close, thus short circuiting the first section of the resistance R', thereby causing the motor to increase its speed. In a similar manner the switch $S^3$ will close when the control conductor 1 is connected to the positive line through the finger $k^4$ in the position $p^3$ of the master controller. This will short circuit the section of the resistance $R^2$ and give a still higher motor speed. In the final position of the master controller, indicated by $p^4$, the control conductor will be again connected to the negative and the switch $S^4$ will close, thus short circuitnig the remaining resistance $R^3$ and giving full motor speed.

The switch $S^4$ carries an auxiliary switch $s^4$ which opens when the switch $S^4$ closes. This serves to disconnect the control conductor 1 from the windings of all of the switches except that of the switch $S^4$ which maintains its connection to the control conductor 1 through the wire 41 and the auxiliary switch $s'^3$ carried by the switch $S^3$.

If now the master controller K be returned to the off-position, the control conductor 1 will be disconnected from both sides of the line at the master controller and, therefore, the two halves of the winding of the relay L will be left in series and across the supply mains, and, as already mentioned, these two halves of the winding oppose each other so that no magnetization will result and the relay L will open, thus opening the auxiliary switches $l^2$ and $l^3$. This in turn disconnects the control wires 2' and 3' from the source of current so that all of the switch windings of the controller are opened. Consequently, these switches open, thereby disconnecting the motor from the line. If now the master controller be operated in the reverse direction from the off-position to the position indicated by $p'^1$, the control conductor 1 will first be connected to the positive side of the line through the contact finger $k^4$, the strip $k'^7$, the strip $k'^5$, and the contact finger $k'$. The lower half of the winding of the relay L will then be energized, the switches $l^2$ and $l^3$ will close, thereby connecting the control wires 2' and 3' to the positive and negative sides of the switch S as before. The circuit will then be established as follows: from the control conductor 1', through the wire 26, the resistance $r^6$, the wire 21, the winding of the reversing switch B, the wire 22, the auxiliary switch $f^3$, and the wire 23 to the negative control wire 3'. The reversing switch B will then close and after it has closed will establish a circuit for its winding as follows: from the positive control wire 2', through the wire 35, the auxiliary switch $b'$, the wires 30 and 21, the winding of the switch B, the wire 22, the auxiliary switch $f^3$ and the wire 23 to the negative control conductor 3'. The reversing switch B in closing also opens the auxiliary switch $b^3$, which in turn disconnects one end of the winding of the other reversing switch F from the positive control wire 2' to which it was previously connected through the wire 24, the auxiliary switch $b^3$, and the wire 27. The reversing switch F is, therefore, inoperative as long as the reversing switch B is closed. The reversing switch B in closing also closes the auxiliary switch $b^2$ which completes the circuit through the winding of the first resistance switch S' as follows: from the positive connection 5 at the master controller, through the contact finger $k^4$, the strip $k'^7$, the strip $k'^5$, the contact finger $k'$, the control conductors 1 and 1', the wire 26, the wire 32, the auxiliary switch $b^2$, the wires 34 and 25, and the resistance $r'$, the winding of the switch S', and the wire 36 to the negative control wire 3'. The switch S' then closes completing the circuit through the motor as follows: from the positive side of the switch S, through the wire 13, the resistance sections $R^3$, $R^2$, and R', the switch S', the wire 14, the field winding W, the switch contacts $B^2$, the wire 16, the armature A, the wire 15, the switch contacts B', and the wire 17 to the negative side of the line at the switch S. It will be observed that current now flows through the armature in a direction the reverse of that previously described while the direction of current flow through the field winding is unchanged. The armature will, therefore, rotate in a reversed direction.

When the master controller is moved to the position indicated by $p'^2$, the switch $S^2$ will close its circuit connections and will close in a manner identical with that which occurred when the controller was given the position corresponding to $p^2$ in the forward position. The switches $S^3$ and $S^4$ will likewise close in a similar manner as the controller is advanced to the full speed position. When the controller is again brought to the off-position, the differential windings of the relay L will oppose each other and the relay will drop its plunger, thus opening the switches $l^2$ and $l^3$ cutting off the supply of current from all of the switch operating magnets in the controller thus causing these switches to open and disconnect the motor from the line.

It will be seen that my invention provides simple means for controlling both the direction of rotation and the speed of electric motors through the agency of but a single control wire between the master controller and the controlling devices which control the connections to the motor and which are preferably placed adjacent to the motor to be controlled.

It will, of course, be evident to those skilled in the art that means other than the resistance sections $R'$, $R^2$, and $R^3$ may be made use of in controlling the speed of the motor. For instance, in the case of an alternating current motor the resistance sections might be replaced with sections in the winding of a transformer.

Referring now to Fig. 2, I have therein illustrated my invention as applied to electrically operated trains equipped with a number of motor driven cars indicated as $C'$, $C^2$, $C^3$, and $C^4$, ordinary railway cars D not equipped with motors being interposed between the cars equipped with driving motors. The operating controller K is indicated as in connection with the leading motor car $C'$, the contacts of the controller being shown outside of the outlines of the car for the sake of clearness. The control conductor 1 leading from the master controller K is shown as connected to the middle point of the winding of the relay L on the car $C'$ and also as connected through a contact shoe $m^2$ with a stationary control conductor $q$. The upper end of the relay winding is connected by means of a contact shoe $n^2$ to the main power conductor N which may be a trolley wire or a stationary conducting rail, while the other end of the winding of the relay L is indicated as connected to the truck of a car, which in turn, is connected to the rails G which form the return for the main power circuit. In Fig. 2 connections beyond the winding of the relay L have been omitted, it being understood that each of the motor driven cars would be equipped with controlling apparatus identical with that indicated diagrammatically in Fig. 1, or with modifications of the same to meet the characteristics and number of the motors to be employed.

It will be observed that in Fig. 2 I have shown a stationary control conductor $q$ for connecting the master controller on the leading car of the train with the control apparatus on the other cars in the train, this being the arrangement disclosed in United States Patent No. 884,644, issued to me April 14, 1908, and being the preferable arrangement in a railway in which cars of other lines are of necessity transported and to secure the best results are placed between the motor driven cars in making up trains. In a case of railways operating only their own cars the stationary control conductor $q$ could, of course, be replaced by a single train conductor with which all cars would be equipped together with flexible couplings at the ends of each car by means of which all of the cars in a train could be so coupled that a continuous control conductor would extend through the length of the train.

I claim—

1. In a control system, the combination of a series of electrically-actuated speed-controlling switches, a control circuit, adjacent pairs of said switches having one end of their windings connected to opposite sides of the control circuit and the other end of their windings adapted to be connected to a common control conductor, and means for connecting said common control conductor to one and then to the other side of the control circuit in order to cause the successive closure of the said speed-controlling switches.

2. In a control system, the combination of a control circuit, a plurality of electrically-actuated speed-controlling switches arranged to be closed in a predetermined order, succeeding switches in the order of their closure having one end of their windings connected to opposite sides of the control circuit and the other ends adapted to be connected to a common control conductor, and means for alternately connecting said control conductor to one side and then to the other side of said control circuit.

3. In a control system, the combination of a series of electrically actuated switches the successive closure of which governs the speed of an electric motor, a master controller, a single conductor between said master controller and the windings of said series of electrically actuated switches, the connections being such that the step by step actuation of the said master-controller causes the successive energization of the windings of said series of electrically actuated switches.

4. In a control system, an electric motor, an electrically governed reversing switch for controlling the direction of rotation of said motor, a plurality of independently actuated switches for controlling the speed of said motor, a master controller for governing the action of said reversing switch and the successive closure of said speed controlling switches, and a single conductor between said master controller and said reversing and speed controlling switches.

5. In a control system, a reversing switch, a series of independently actuated speed controlling switches, a master switch, a single conductor between said master switch and said reversing and speed controlling switches, and means at the master switch for producing successive reversals of the direction of current flow through said control conductor for causing successive closure of said switches.

6. In a control system, an electrically governed reversing switch and a plurality of independent electrically governed speed controlling switches, a master controller, a single control conductor between said master controller and said reversing and speed controlling switches, means at the master controller for successively reversing the direction of current flow through said control conductor when the master controller is actuated from the off position determining the action of said reversing switch and succeeding reversals of the direction of current flow through said control conductor causing the successive actuation of said speed controlling switches.

7. In a control system, the combination of a power circuit, a control circuit derived from said power circuit, an electrically governed reversing switch, independent electrically governed speed controlling switches arranged to be governed by current supplied from said control circuit, a master controller, a single control conductor leading from said master switch and adapted to control the action of said reversing switch and the successive action of said speed controlling switches, means for connecting said control circuit to said power circuit while current is flowing through said control conductor in either direction, and means for disconnecting said control circuit from said power circuit when current ceases to flow through said control conductor.

8. In a control system, a power circuit, a control circuit derived from said power circuit, a plurality of electrically governed motor control switches, the governing current for said switches being derived from said control circuit, a master switch, a single control conductor leading from said master switch, a differentially wound relay having contacts for connecting said control circuit to said power circuit, the ends of the winding of said relay being connected to the two sides of said power circuit and the middle point of said winding being connected to said single control conductor.

Signed at Cleveland, Ohio, this 1st day of Dec., 1908.

ARTHUR C. EASTWOOD.

Witnesses:
H. L. STRATTON,
H. M. DIEMER.